United States Patent Office 3,806,552
Patented Apr. 23, 1974

3,806,552
PROCESS FOR THE CATALYTIC INTRAMOLECULAR REARRANGEMENT OF DIMETHYLNAPHTHALENES
Isao Oka, Takeo Shima, Takanori Urasaki, and Makoto Ogasawara, Iwakuni, Japan, assignors to Teijin Limited, Osaka, Japan
No Drawing. Filed Nov. 28, 1972, Ser. No. 310,011
Claims priority, application Japan, Dec. 1, 1971, 46/96,919
Int. Cl. C07c 5/24, 15/24
U.S. Cl. 260—668 A
4 Claims

ABSTRACT OF THE DISCLOSURE

An improved process for obtaining a 2,6-dimethylnaphthalene rich product comprising the catalytic intramolecular rearrangement of dimethylnaphthalenes whose content of the dimethylnaphthalene family is at least 60% by weight and not containing in excess of 10 mol percent of trimethylnaphthalene, using a mixed catalyst consisting of (a) 65–95% by weight of a hydrogen form of mordenite in which above 80% by weight of the metal cations are replaced with hydrogen ions, and
(b) 35–5% by weight of assistant catalyst selected from the group consisting of bentonite and fuller's earth.

---

This invention relates to an improved process whereby high purity 2,6 - dimethylnaphthalene can be obtained with not only excellent conversion and selectivity but also a marked reduction in the content of the undesirable 2,7-dimethylnaphthalene, using a mixed catalyst of prolonged life and low cost and without setting up of the objectionable disproportionation reaction. In addition, an improvement is had in the efficiency with which the resulting 2,6-dimethylnaphthalene is isolated. More particularly, the invention relates to a process of obtaining a 2,6 - dimethylnaphthalene - rich product which comprises carrying out the catalytic intramolecular rearrangement of dimethylnaphthalenes consisting of the 2,6-dimethylnaphthalene family whose content of 2,6 - dimethylnaphthalene is below its thermodynamic equilibrium concentration, the rearrangement reaction being carried out at a temperature ranging from 260° to 365° C. in the presence of a carrier gas and a mordenite catalyst, characterized in that said rearrangement reaction is carried out using as the starting material that consisting of dimethylnaphthalenes whose content of the 2,6 - dimethylnaphthalene family is at least 60% by weight and not containing in excess of 10 mol percent of trimethylnaphthalene, and in the presence of a mixed catalyst consisting of (a) 65–95% by weight of hydrogen form of mordenite in which above 80% by weight of the metal cations are replaced with hydrogen ions, and
(b) 35–5% by weight of an assistant catalyst selected from the group consisting of bentonite and fuller's earth.

Ten isomers of dimethylnaphthalene are known. According to the present invention, the desired 2,6-dimethylnaphthalene isomer is selectively obtained by the intramolecular rearrangement from the dimethylnaphthalenes consisting of the 2,6-dimethylnaphthalene family whose content of 2,6-dimethylnaphthalene is below its thermodynamic equilibrium concentration. 2,6-dimethylnaphthalene can be readily converted by oxidation to 2,6-naphthalenedicarboxylic acid, which, in turn, becomes a raw material for the production of polyesters that are useful as fibers, films, etc.

This invention concerns the process for the selective intramolecular rearrangement of dimethylnaphthalenes, including the migration of the methyl group between $\alpha \rightleftarrows \beta$ and $\alpha' \rightleftarrows \beta'$ shown in the following formula:

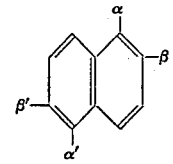

As the process for the production of dimethylnaphthalenes, a process has been hitherto known for the production of 2,3-, 2,6- and 2,7-dimethylnaphthalenes by rearranging the component containing alkylnaphthalene with a boiling point in the range of 400° to 550° F. using a silica-alumina catalyst (see U. S. Pat. 3,235,615).

However, this process is beset with side reactions such as demethylation, and its isomerization selectivity is poor such as to result in exceedingly low isomerization yields.

British patent specification No. 1,039,246 discloses a process for the catalytic intra- and/or intermolecular rearrangement of the alkyl groups present in the alkylaromatic hydrocarbons, which comprises contacting a $C_7$–$C_{15}$ alkylaromatic hydrocarbon with hydrogen mordenite at a temperature between 200° and 600° C.

The same drawbacks as those of the foregoing U.S. patent also apply in the case of this British patent. For instance, it is proposed therein that a sodium form of mordenite commercially available as Zeolon from the Norton Company (U.S.A.) should be converted to the hydrogen form, and that the mordenite so formed, in which the hydrogen form accounts for at least 95% by weight, should be used.

Furthermore, in this patent there are given examples indicating that a metal selected from the Groups I–B, VI–B and iron group metals of group VIII can be added to the mordenite catalysts by the ion-exchange or impregnation method, in an amount of from 0.01 to 20% by weight, and specifically; that a maximum of 5% by weight of Ag and a maximum of 3% by weight of Ni were incorporated in the hydrogen mordenite. There is moreover no specific description in this patent as regards the catalytic rearrangement reaction of dimethylnaphthalenes.

In carrying out at a temperature of 260–365° C. in the presence of a carrier gas and a mordenite catalyst, the catalytic intramolecular rearrangement reaction of dimethylnaphthalenes consisting of the 2,6-dimethylnaphthalene family whose content of 2,6 - dimethylnaphthalene is below its thermodynamic equilibrium concentration, it is, as a practical matter, exceedingly difficult for this process to check the intermolecular rearrangement reaction which is set up along with the intended intramolecular rearrangement reaction. In consequences, it is difficult to obtain 2,6-dimethylnaphthalene in high purity, it being practically impossible to avoid the admixture in the 2,6-dimethylnaphthalene of the objectionable 2,7 - dimethylnaphthalene, which cannot be separated satisfactorily by such methods as recrystallization or distillation.

We found that by utilizing especially from among the conventional mordenite catalysts (e.g., that recommended for use in the rearrangement procedure disclosed in the aforesaid British patent specification No. 1,039,246, which requires that for obtaining desirable results the rearrangement reaction be carried out under such pressure conditions of a total pressure of 7 to 140 atm., and especially from 35 to 70 atm.) that of the hydrogen form in which above 80% by weight, and preferably above 90% by weight, of the metal cations are replaced with hydrogen ions, and by utilizing this catalyst preferably in an amount within a specified range and, in addition, by using conjointly therewith an assistant catalyst selected from bentonite and fuller's earth, the assistant catalytic effect of which has not been known at all heretofore, and also using this assistant catalyst preferably in an amount within a specified range, it was possible to prepare high purity 2,6-dimethylnaphthalene containing substantially no 2,7-dimethylnaphthalene, at commercially favorable conditions of low pressure, and especially under pressure conditions of less than 7 atm., as well as with improved conversion and selectivity and with prolonged catalytic life and low catalyst cost. It was also found that the amount of 1,5 - dimethylnaphthalene, which hinders the isolation and collection of 2,6 - dimethylnaphthalene, could be greatly reduced to improve the isolation of the intended 2,6-dimethylnaphthalene.

It is therefore an object of the present invention to provide an improved process for preparing high purity 2,6-dimethylnaphthalene, which is readily isolated from the rearrangement reaction product and in which the undesirable 2,7 - dimethylnaphthalene and 1,5 - dimethylnaphthalene have been greatly reduced, the process being accomplished by the use of a low cost mixed catalyst having a prolonged catalytic life.

Other objects and advantages of the present invention will become apparent from the following description.

The starting dimethylnaphthalenes to be used in this invention are the dimethylnaphthalenes consisting of or including the 2,6 - dimethylnaphthalene family of the following formula in which the content of 2,6 - dimethylnaphthalene is below its dynamic equilibrium concentration.

2,6-DMN⇌1,6-DMN⇌1,5-DMN wherein DMN stands for dimethylnaphthalene (to be applied equally hereinafter).

In the present invention the starting dimethylnaphthalene material used is one whose content of trimethylnaphthalene does not exceed 10 mol percent and in which the 2,6-dimethylnaphthalene family is contained in an amount of at least 60% by weight, preferably at least 75% by weight, and still more preferably at least 85% by weight. For instance, the starting dimethylnaphthalene material is one containing 2,6-DMN, 1,6-DMN or 1,5-DMN, and mixtures of two or three classes of these dimethylnaphthalenes, and in which the content of 2,6-DMN is below the thermodynamic equilibrium concentration of 2,6 - DMN, and the other optional isomers account for not more than 40% by weight, preferably not more than 25% by weight, and still more preferably not more than 15% by weight of the starting material. The use of the starting dimethylnaphthalene material until the content of trimethylnaphthalene exceeds 10 mol percent must be avoided, since this will result in the formation of the by-product 2,7-dimethylnaphthalene in an amount that cannot be ignored.

In the invention process the mixed catalyst system consisting of the following components (a) and (b) is used.

(a) a hydrogen form of mordenite in which above 80% by weight of the metal cations are replaced with hydrogen ions, and (b) an assistant catalyst selected from the group of bentonite and fuller's earth.

This mixed catalyst in which the two components are mixed in a proportion of about 65%–about 95% of the component (a) and about 35–5% of the component (b). The intended improvement of the invention being best demonstrated, when component (a) is contained in about 70%–about 90% in said mixed catalyst.

As for said mordenite, it is preferable that it should have an effective pore diameter of M–11 A. This mordenite catalyst possesses great resistance to acids and can be replaced with hydrogen even through it is directly treated wth acids. This mordenite catalyst can be obtained usually either by exchanging a sodium substituted product with ammonium ions and thereafter calcining to obtain the hydrogen substituted form or by treating the commercially available sodium substituted product with a mineral acid. Aside from these, the hydrogen form of mordenite in which above 80% by weight of the metal cations are replaced with hydrogen ions, which have been obtained by any of the other known methods, can also be used. As the other metals that the foregoing mordenite catalyst can contain in an amount up to 20% by weight, mention can be made of such as Li, Na, K, Mg, Be, Ca, Sr, Ba, Zn, and Al.

The following are used as assistant catalyst in the mixed catalyst of the present invention.

(a) Bentonite.—This clay consists essentially of montmorillonite or beidelite. Its suspension is weakly alkaline. Some remarkably swell in water (to above five times their original volume).

(b) Fuller's earth.—This, too, consists essentially of montmorillonite or beidelite. Its suspension is neutral or weakly acidic. This includes Japanese acid clay.

The activity of these clays can be modified by treatment with $H_2SO_4$ or HCl or the like at a temperature between room temperature and their boiling point. By such treatment, these clays are made more active, or less active, or almost unchanged in activity, and highly active clays are not always used in the present reaction.

If the activity is too high, side reactions other than intramolecular rearrangement tend to occur, and in such a case a suitable acid treatment can be made use of to adjust the activity.

The bentonite and fuller's earth used in the present invention are procurable in the market, and although the commercial products may be used without modification, it is preferable to use them after treatment with acids.

Namely, preferred is the hydrogen form of bentonite or fuller's earth in which more than 30% by weight, preferably 85% by weight, of the metal cations are replaced with hydrogen ions. Needless to say, the metal form of bentonite or fuller's earth in which more than 70% by weight are metal cations can also be used. As the metal cations of this metal form of bentonite or fuller's earth, mention can be made of such, for example, as the cations of Na, K, Mg, Ca, Sr, Ba, Al, Ti, Zr, Cr, Mo, Mn, Re, Co, Ni, Pd, Zn and Cd. Of these, preferred are the metal cations of Na, K, Ca, Sr, Mg, Al, Zn and Cd.

The suitability of mixing the hydrogen form of mordenite (a) and the assistant catalyst (b) in the proportions hereinbefore indicated herein can be seen by reference to the hereinafter given control experiments in which the proportion of mix is without the preferred range. It is seen that the intended improvement of the invention cannot be achieved in respect of one or more points such as conversion, selectivity, catalytic life, the rate of formation of the byproduct 2,7-DMN, and the content of 1,5-DMN when the proportion of mixed catalyst is not within the range.

The mixed catalyst composition used in the present invention may be supported on a carrier such as alumina, silica, silica-alumina or titanium oxide. Also, it may support a noble metal such as platinum or palladium.

The isomerization reaction of the present invention may be carried out by using a fixed bed or fluidized type bed reaction apparatus, but it is preferable to use a fixed bed type reaction apparatus from the viewpoint of reaction operation.

The reaction temperature used in the process of the present invention is 260–365° C., preferably 260–350° C., and more preferably 280–325° C. In case the reaction temperature is lower than 260° C., the raw material dimethylnaphthalene enters the reaction cylinder as liquid and its conversion lowers; whereas, in case the reaction temperature is too high, inter-molecular rearrangement and decomposition tend to occur. Raising the reaction temperature stepwise from the start of the reaction towards the higher temperature side within the above temperature range is preferred since it results in a longer active lifetime of the catalyst. The isomerization reaction of the present invention is carried out in vapor phase, and it is preferable that the rate of feeding the raw materials dimethylnaphthalenes per hour should be about 0.1–10, especially 0.2–10 times as much as the weight of the catalyst. The pressure in the reaction system should preferably be lower than 7 atmospheres. If the pressure is too high, intermolecular reaction increases and the selectivity of reaction lowers. A carrier gas is used in this reaction. Any substance which is inert to the reactants under the reaction conditions and is gaseous under the reactions may be used as carrier gas, and for example, an inert gas such as nitrogen gas or carbon dioxide gas, water vapor or hydrogen gas, or an aliphatic, alicyclic or aromatic hydrocarbon having 1–10 carbon atoms such as methane, ethane, propane, n-hexane, cyclohexane, benzene, toluene or xylene may be mentioned.

The amount of carrier gas to be used is 0.05–200 molar times, preferably 0.2–100 molar times, and more preferably 1–50 molar times the amount of dimethylnaphthalenes.

The rate of feeding the raw material dimethylnaphthalene in the process of the present invention is maintained at above 0.2 cm.$^3$/cm.$^2$ sec., preferably above 5 cm.$^3$/cm.$^2$ sec., and more preferably above 20 cm.$^3$/cm.$^2$ sec. as superficial linear velocity in the column (as at 300° C., 1 atmosphere). Thus, the isomerization reaction can be carried out with high selectivity.

As regards the reaction operation, the raw material dimethylnaphthalene can be introduced together with a carrier gas into an isomerization reaction zone containing the mixed catalyst of the present invention to perform the reaction at a temperature of 260–360° C. It is a preferable reaction operation to combine the first step of isomerizing the raw material dimethylnaphthalene and the second step of separating 2,6-dimethylnaphthalene from the isomerization reaction product, and circulating for re-use the remainder from which 2,6-dimethylnaphthalene was separated in the second step to the first step. At this time, the dimethylnaphthalene to be circulated and reused may be circulated and reused by itself, or it may be mixed with the raw material dimethylnaphthalene used in the first step and then circulated.

By repeating such circulation, trimethylnaphthalene can be accumulated in the cyclic system to increase its contents.

In practicing the process of the present invention, it is preferable to control so that the trimethylnaphthalene content of the dimethylnaphthalenes in the isomerization reaction zone may be not more than 10 mol percent. The reason has not been clarified, but it has been recognized that dimethylnaphthalenes controlled so as to have a trimethylnaphthalene content of less than 10 mol percent, preferably less than 5 mol percent, tend to cause intramolecular rearrangement alone in the isomerization reaction, and that the selectivity is worsened if trimethylnaphthalenes of an amount over 10 mol percent are subjected to isomerization reaction conditions.

Accordingly, in the embodiment of the present invention where the desired isomerization product is separated from a flow of the resultant isomerization product and the remainder is recycled to the isomerization reaction zone for reuse, it is preferable to remove the trimethylnaphthalene accumulated in the system at a suitable step and control the trimethylnaphthalene content of the isomerization reaction zone below 10 mol percent, preferably below 5 mol percent.

In the process of the present invention, the removal of trimethylnaphthalene from dimethylnaphthalenes can easily be effected by means of distillation, and this removal may be done prior to the separation of 2,6-dimethylnaphthalene from the isomerization reaction product, or after this separation and prior to recycling of the remainder to the isomerization reaction zone. Of the two means, the former is more preferable since it gives higher purity of the product.

The separation of 2,6-dimethylnaphthalene from the isomerization reaction product can easily be carried out by cooling the isomerization reaction product to a proper temperature and separating the precipitated crystals, or by adding a suitable solvent to the isomerization reaction product, cooling the solution and separating the precipitated crystals. As suitable solvents, alcohols such as methanol, ethanol, propanol, isopropanol, butyl alcohol and hexyl alcohol, aliphatic and alicyclic hydrocarbons such as n-pentane, isopentane, n-hexane, isohexane, cyclohexane, methylcyclohexane, n-heptane, 3-methylpentane, n-octane, isooctane, 3,3-dimethylhexane, 2,3-dimethylhexane and 3-ethylhexane, and aromatic hydrocarbons such as benzene, toluene, xylene and ethylbenzene can be mentioned.

The catalyst which has been used in the isomerization reaction of the present invention can be regenerated for reuse by calcining it in a nitrogen gas atmosphere containing 0.5–20% of oxygen gas at a temperature of 450–600° C.

The process of the present invention will be illustrated below by means of examples, with the aid of comparative examples.

By the way, the following definitions are used therein.

(1) Conversion (F value):

$$\frac{2,6\text{-DMN}}{2,6\text{-DMN}+1,6\text{-DMN}+1,5\text{-DMN}} \times \frac{100}{0.45}$$

[wherein 2,6-DMN, 1,6-DMN and 1,5-DMN show molar concentration (mol percent) of each dimethylnaphthalene isomer].

(2) Selectivity (S value):

$$\frac{2,6\text{-DMN}}{2,6\text{-DMN}+\Delta(\text{MN}+\text{TMN})} \times 100$$

[wherein 2,6-DMN show its molar concentration (mol percent) in the isomerization product; and $\Delta$(MN+TMN) shows the difference in molar concentration (mol percent) of monomethylnaphthalene (MN) and trimethylnaphthalene (TMN) between before and after isomerization].

(3) Catalyst life:

The period of time of reaction till the above-defined F value lowers to 85%.

(4) Percentage of by-product 2,7-DMN:

The mol percentage of 2,7-dimethylnaphthalene formed anew based on 2,6-dimethylnaphthalene newly formed by the isomerization reaction.

(5) 1,5-DMN content:

$$\frac{1,5\text{-DMN}}{2,6\text{-DMN}+1,6\text{-DMN}+1,5\text{-DMN}} \times \frac{100}{0.07}$$

[wherein 2,6-DMN, 1,6-DMN and 1,5-DMN each show the concentration (mol percent) of each isomer in the isomerization reaction product].

EXAMPLE 1

A stainless steel reaction cylinder having a diameter of 10 mm. and a length of 3000 mm. was charged with 50 g. of mixed catalyst consisting of 90% by weight of hydrogen type mordenite (95% hydrogen-form); and 10% by weight of fuller's earth (place of origin: Niigata Pref. Japan) and being about 3 mm. in diameter and about 7 mm. in length. Then the cylinder was heated at 310° C. While heating the cylinder at this temperature, dry hydrogen gas heated at 300° C. was fed to the cylinder from its top at a rate of 0.3 l./min. (volume as calculated at room temperature under atmospheric pressure, and at the same time 1,5-dimethylnaphthalene was fed at a rate of 20 g./hr. (SV=0.4). The reaction was carried out under atmospheric pressure, and the reaction product was collected at its cooled bottom.

The reaction was continued for 5 days, and then the average conversion, selectivity, percentage of byproduct 2,7-DMN and 1,5-DMN content were calculated. The results were as follows:

TABLE 1

| | |
|---|---|
| Conversion ......................................percent.. | 93.7 |
| Selectivity ..........................................do.... | 96.8 |
| Percentage of byproduct 2,7-DMN ........do.... | 0.2 |
| 1,5-DMN content ..............................do.... | 221.4 |
| Catalyst life .....................................hrs.. | 88 |

EXAMPLES 2-17 AND COMPARATIVE EXAMPLES 1-7

The procedure of Example 1 was followed to isomerize 1,5-dimethylnaphthalene, except that a catalyst having the composition shown in the following Table 2 was used. The results were as shown in Table 2.

By the way, in the row for mordenite component H, Na, Mg, Al and Be mean hydrogen form, sodium form, magnesium form, aluminum form and beryllium form, respectively. In the row for assistant catalyst, acid treatment means leaching with hydrochloric acid, and alkali treatment means leaching with sodium hydroxide.

Table 4 was fed thereto at a rate of 40 g./hr. (SV=0.8). Thus, the reaction was continued for 50 hours. The resultant product was dissolved in 3 times its weight of methanol, recrystallized at 5° C. and separated.

On the other hand, the filtrate was subjected to distillation to expel methanol, initial fraction obtained at temperatures up to 260° C. and high-boiling fraction obtained at temperatures above 265° C. were removed, and to the main fraction were added 1,5-dimethylnaphthalene and 1,6-dimethylnaphthalene so that the resultant composition might contain less than 4% of methylnaphthalene, less than 4% of trimethylnaphthalene and an amount of 1,5-dimethylnaphthalene roughly the same with that of 1,6-dimethylnaphthalene, and the reaction was carried out anew using this composition as raw material and using a regenerated catalyst. Thus, this reaction was conducted three times, re-cycling the raw material twice. The results were as shown in the following table.

In each of the three reactions, the proportion of 2,7-dimethylnaphthalene to 2,6-dimethylnaphthalene in the crystals obtained was less than 0.5%.

TABLE 2

| | Catalyst composition | | | | | | Percent | | | | |
|---|---|---|---|---|---|---|---|---|---|---|---|
| | Wt. percent | | | | | | | | | | |
| | Mordenite component | Assistant catalyst component | Mordenite component form | Assistant catalyst component type | Place of origin | Pretreatment | Conversion | Selectivity | Percentage of byproduct 2,7-DMN | 1,5-DMN content | Catalyst life (hrs.) |
| Comp. Ex. 1.... | 100 | 0 | H, 95%; Na, 5% | | | | 88.3 | 86.3 | 2.4 | 335.7 | 39 |
| Ex. 2.... | 80 | 20 | H, 95%; Na, 5% | Bentonite | Gumma, Japan | None | 94.0 | 96.9 | 0.2 | 222.1 | 91 |
| Comp. Ex. 2.... | 55 | 45 | H, 95%; Na, 5% | do | do | do | 33.6 | 100.0 | 0.0 | 732.9 | 50 |
| Comp. Ex. 3.... | 55 | 45 | H, 95%; Na, 5% | Fuller's earth | Niigata, Japan | do | 30.4 | 100.0 | 0.0 | 682.9 | 48 |
| Ex. 3.... | 90 | 10 | H, 95%; Na, 5% | Bentonite | Gumma, Japan | do | 93.9 | 97.0 | 0.2 | 218.3 | 90 |
| Comp. Ex. 4.... | 98 | 2 | H, 70%; Na, 30% | do | do | do | 59.0 | 99.3 | 0.2 | 502.4 | 23 |
| Comp. Ex. 5.... | 98 | 2 | H, 70%; Na, 30% | Fuller's earth | Niigata, Japan | do | 50.3 | 99.1 | 0.2 | 453.8 | 21 |
| Ex. 4¹.... | 90 | 10 | H, 95%; Na, 5% | Bentonite | Gumma, Japan | do | 93.0 | 96.6 | 0.2 | 235.7 | 82 |
| Ex. 5¹.... | 90 | 10 | H, 95%; Na, 5% | Fuller's earth | Niiata, Japan | do | 93.4 | 96.4 | 0.3 | 221.8 | 85 |
| Ex. 6.... | 90 | 10 | H, 95%; Na, 5% | do | do | Acid-treated | 93.7 | 96.9 | 0.2 | 220.1 | 88 |
| Ex. 7.... | 90 | 10 | H, 95%; Na, 5% | Bentonite | Gumma, Japan | do | 94.1 | 96.9 | 0.2 | 229.3 | 92 |
| Ex. 8.... | 90 | 10 | H, 85%; Al, 10%; Na, 5%. | do | do | None | 93.5 | 96.3 | 0.2 | 226.8 | 86 |
| Ex. 9.... | 90 | 10 | H, 85%; Mg, 10%; Na, 5%. | Fuller's earth | Niigata, Japan | do | 93.8 | 96.3 | 0.2 | 219.9 | 89 |
| Ex. 10... | 90 | 10 | H, 85%; Al, 10%; Na, 5%. | Bentonite | Gumma, Japan | Acid-treated | 94.0 | 96.9 | 0.2 | 223.8 | 91 |
| Ex. 11... | 90 | 10 | H, 85%; Be, 10%; Na, 5%. | Fuller's earth | Niigata, Japan | do | 94.3 | 96.9 | 0.2 | 221.1 | 94 |
| Comp. Ex. 6.... | 55 | 45 | H, 95%; Na, 5% | do | do | do | 27.0 | 100.0 | 0.0 | 701.4 | 57 |
| Comp. Ex. 7.... | 55 | 45 | H, 95%; Na, 5% | Bentonite | Gumma, Japan | do | 32.4 | 100.0 | 0.0 | 735.7 | 59 |
| Ex. 12... | 90 | 10 | H, 95%; Na, 5% | Fuller's earth | Niigata, Japan | Alkali-treated | 92.5 | 98.1 | 0.1 | 231.8 | 77 |
| Ex. 13... | 90 | 10 | H, 95%; Na, 5% | Bentonite | Gumma, Japan | do | 92.4 | 97.9 | 0.1 | 243.2 | 71 |
| Ex. 14... | 90 | 10 | H, 95%; Na, 5% | do | Wyoming, U.S.A. | None | 93.1 | 96.9 | 0.2 | 217.9 | 94 |
| Ex. 15... | 90 | 10 | H, 95%; Na, 5% | do | Montana, U.S.A. | do | 90.7 | 95.8 | 0.2 | 221.5 | 92 |
| Ex. 16... | 90 | 10 | H, 95%; Na, 5% | Fuller's earth | Florida, U.S.A. | do | 91.1 | 95.7 | 0.2 | 218.3 | 91 |
| Ex. 17... | 90 | 10 | H, 95%; Na, 5% | do | Mississippi, U.S.A. | do | 92.8 | 97.0 | 0.2 | 218.5 | 93 |

¹ The catalyst compositions of Examples 4 and 5 have supported thereon 0.5% Pt.

EXAMPLE 18

The procedure of Example 1 was followed to effect isomerization, except that a reaction pressure of 10 kg./cm.² and a dry hydrogen flow rate of 1.5 l./min. were employed. The results were as shown in the following table.

TABLE 3

| | |
|---|---|
| Conversion ......................................percent.. | 94.7 |
| Selectivity ..........................................do.... | 96.8 |
| Percentage of byproduct 2,7-DMN ........do.... | 0.4 |
| 1,5-DMN content ..............................do.... | 209.8 |
| Catalyst life .....................................hrs.. | 99 |

EXAMPLE 19

The reaction cylinder used in Example 1 was charged with 50 g. of the catalyst used in Example 1. While maintaining the temperature of the cylinder at 305° C., dry nitrogen gas heated to 305° C. was fed under atmospheric pressure to the cylinder at its top at a rate of 1.2 l./min., and at the same time the raw material mixture shown in

TABLE 4

| | 1st round reaction | | 2nd round reaction | | 3rd round reaction | |
|---|---|---|---|---|---|---|
| | Raw material | Product | Raw material | Product | Raw material | Product |
| 2,6-dimethylnaphthalene, mol percent..... | 8.7 | 41.3 | 7.5 | 41.3 | 7.1 | 42.0 |
| 2,7-dimethylnaphthalene, mol percent..... | 0.0 | 0.2 | 0.3 | 0.3 | 0.2 | 0.3 |
| 1,6-dimethylnaphthalene, mol percent..... | 42.8 | 36.6 | 40.0 | 37.0 | 42.8 | 36.6 |
| 1,5-dimethylnaphthalene, mol percent..... | 42.5 | 12.4 | 46.4 | 12.5 | 44.0 | 12.6 |
| Other dimethylnaphthalenes, mol percent.. | 0.1 | 0.2 | 0.4 | 0.4 | 0.4 | 0.3 |
| Methylnaphthalene, mol percent........... | 2.8 | 4.6 | 2.6 | 4.2 | 2.7 | 4.0 |
| Trimethylnaphthalene, mol percent........ | 3.1 | 4.7 | 2.8 | 4.3 | 2.8 | 4.2 |
| Conversion, percent.............. | | 101.6 | | 101.6 | | 102.3 |
| Selectivity, percent.............. | | 92.4 | | 93.0 | | 94.0 |
| By-product 2,7-DMN, percent...... | | 0.2 | | 0.1 | | 0.1 |
| 1,5-DMN content, percent........ | | 196.2 | | 196.7 | | 197.4 |

COMPARATIVE EXAMPLE 8

The procedure of Example 1 was followed, except that a dimethylnaphthalene mixture having the following composition and containing 25 mol percent of trimethylnaphthalene was used as starting material.

| | Mol percent |
|---|---|
| 1,5-DMN | 34.1 |
| 1,6-DMN | 32.6 |
| 2,6-DMN | 8.3 |
| 2,7-DMN | 0.0 |
| MN | 0.0 |
| TMN | 25.0 |

The results were as shown in the following table.

TABLE 5

| | | |
|---|---|---|
| Conversion | percent | 98.0 |
| Selectivity | do | 93.8 |
| Byproduct 2,7-DMN | do | 6.7 |
| 1,5-DMN content | do | 231.1 |
| Catalyst life | hrs | 87 |

COMPARATIVE EXAMPLE 9

The procedure of Example 1 was followed to effect isomerization, except that the circulation of hydrogen gas was omitted.

The results were as shown in the following table.

TABLE 6

| | | |
|---|---|---|
| Conversion | percent | 48.5 |
| Selectivity | do | 97.3 |
| Byproduct 2,7-DMN | do | 0.0 |
| 1,5-DMN content | do | 551.9 |
| Catalyst life | hrs | 10 |

We claim:

1. In a process for obtaining a 2,6-dimethylnaphthalene-rich product by carrying out the catalytic intramolecular rearrangement of dimethylnaphthalenes consisting of the 2,6-dimethylnaphthalene family whose content of 2,6-dimethylnaphthalene is less than its thermodynamic equilibrium concentration wherein said rearrangement reaction is carried out at a temperature ranging from 260° to 365° C. in the presence of a carrier gas and a mordenite catalyst, the improvement comprising using as the starting material that consisting of dimethylnaphthalenes whose content of the dimethylnaphthalene family is at least 60% by weight and not containing in excess of 10 mol percent of trimethylnaphthalene, and carrying out said rearrangement in the presence of a mixed catalyst consisting of
   (a) 65–95% by weight of a hydrogen form of mordenite in which above 80% by weight of the metal cations are replaced with hydrogen ions, and
   (b) 35–5% by weight of an assistant catalyst selected from the group consisting of bentonite and fuller's earth.

2. The process according to claim 1 wherein the feeding rate per hour of said dimethylnaphthalenes is 0.1–10 times the weight of said catalsyt.

3. The process according to claim 1 wherein the amount of said carrier gas is 0.05–200 molar times the amount of the dimethylnaphthalenes.

4. The process according to claim 1 which comprises conveying the product flow formed by said catalytic intramolecular rearrangement to a 2,6-dimethylnaphthalene separating zone where 2,6-dimethylnaphthalene is isolated and collected, and the remaining flow is recycled to said catalytic intramolecular rearrangement zone for reuse, with the provision that before the content of trimethylnaphthalene accumulating in the recycling system reaches an amount in excess of 10 mol percent of the starting dimethylnaphthalenes said accumulated trimethylnaphthalene is eliminated externally of the system at a point subsequent to said rearrangement zone and before it is recycled for reuse in said zone.

References Cited

UNITED STATES PATENTS

| 3,235,615 | 2/1966 | Allen et al. | 260—668 F |
| 3,562,342 | 2/1971 | Hebert et al. | 260—668A |
| 3,336,411 | 8/1967 | Benham | 260—668 F |
| 3,723,552 | 3/1973 | Mitsche et al. | 260—668 A |

CURTIS R. DAVIS, Primary Examiner

U.S. Cl. X.R.

260—668 F